United States Patent [19]

Littman et al.

[11] Patent Number: 5,248,222

[45] Date of Patent: Sep. 28, 1993

[54] AUTOMATIC PARTICLE TRANSPORT SYSTEM

[76] Inventors: Howard Littman, 7 Tulip Tree La.; Morris H. Morgan, 1233 Viewmont Dr., both of Schenectady, N.Y. 12309

[21] Appl. No.: 775,457

[22] Filed: Oct. 15, 1991

[51] Int. Cl.⁵ ............................................. B65G 53/12
[52] U.S. Cl. ..................................... 406/142; 406/143
[58] Field of Search ................... 406/39, 142, 143, 173

[56] References Cited

U.S. PATENT DOCUMENTS

| 496,684 | 5/1993 | Griscom | 406/142 X |
|---|---|---|---|
| 3,236,565 | 2/1966 | Koster et al. | 406/173 |
| 4,423,987 | 1/1984 | Powers | 406/173 X |
| 4,502,819 | 3/1985 | Fujii et al. | 406/142 X |
| 4,521,139 | 6/1985 | Kretschmer et al. | 406/142 X |
| 5,000,624 | 3/1991 | Steiger | 406/124 |

FOREIGN PATENT DOCUMENTS

| 1281931 | 10/1964 | Fed. Rep. of Germany | 406/142 |
|---|---|---|---|
| 37031 | 2/1988 | Japan | 406/39 |
| 180992 | 10/1964 | U.S.S.R. | 406/142 |

*Primary Examiner*—David M. Mitchell
*Assistant Examiner*—Gary C. Hoge
*Attorney, Agent, or Firm*—Richard C. Litman

[57] ABSTRACT

A system is disclosed for transporting solid particles having a size range from 1/10 micron to 22 mm. in diameter, including a feed hopper formed of an inverted cone frustum, a cylindrical tube, and an inverted cone, a source of solid particles contained in the feed hopper, a transparent pipe inserted into the feed hopper coaxially with the axis of the feed hopper, fluid introducing pipes for introducing fluid such as gas or liquid into the bottom of the feed hopper including a spout inlet feed pipe at the apex of the inverted cone and coaxially located opposite the transport pipe and forming an adjustable gap between the bottom of the transport pipe and the top of the spout inlet pipe, and at least one annulus feed pipe entering a side wall of the inverted cone, and computer controlled values to regulate the temperature, humidity and rate of flow of the introduced fluid. The solid particles are fluidized in the hopper and then fed into the transport pipe to be delivered where desired. In one preferred embodiment the solid particles obscure infrared radiation, and accordingly, a cloud of such particles vented outside a vehicle from inside a vehicle is effective to obscure the movement of such a vehicle from infrared ray detectors.

17 Claims, 3 Drawing Sheets

AUTOMATIC PARTICLE TRANSPORT SYSTEM

AUTOMATIC PARTICLE TRANSPORT SYSTEM

The Government has rights in this invention pursuant to contract DAAA15-86-K-0016 awarded by the U.S. Army Armament, Munitions and Chemical Command. The invention described herein may be manufactured, used and licensed by or for the Government for governmental purposes without the payment to us of any royalty thereon.

BACKGROUND OF THE INVENTION

1. Field of the Invention

This invention relates to apparatus for fluidizing and transporting particles. More particularly, the Automated Particle Transport System (APTS) is a transport system designed to disseminate powders and to maximize the deagglomerated yield of solid particles in the spray. A conventional sampled data PID control system runs the transport line and feeder, periodically sampling and recording selected sensor and set point readings for off-line analysis. The system is capable of transporting fine or coarse particles at variable rates for any period depending on the capacity of the container. The invention is particularly useful for confusing or blocking the operation of single or multi-spectral sensors by forming a cloud of single or multi-spectral obscurants through controlled dispersion. While the term "fluidizing" has a more specific meaning in some of the areas relating to the study and control of fluids, it is used in this application in a more generic sense to identify the result of using either a gas or a liquid to deagglomerate and transport solid particles.

2. Description Of the Related Prior Art

The inventors are not aware of any prior art, taken either alone or in combination, which could reasonably be seen to describe the instant invention.

SUMMARY AND OBJECTS OF THE INVENTION

The present invention is a system for aerating or permeating fine or coarse particles and transporting them, along with the carrying fluid, through a transport pipe. The lower end of the transport pipe is immersed in a unit called the spout fluid bed feeder. This comprises a closed annulus which includes a hopper shaped as the frustum of a cone, used for holding the particles to be transported, and a smaller, vertically aligned lower cone connected to the upper cone by a cylindrical tube section. The particles pass down through the tube section into the lower cone where they mix with incoming fluid, usually air, which enters the lower cone through a spout inlet tube and one or more annulus feed tubes. The fluidized particles are then transported into the transport pipe and dispersed as a cloud. In the laboratory, the particles are carried vertically to a conventional cyclone which separates out the larger particles to be returned to the feed hopper through a solids return line. The smaller fluidized particles continue on to a baghouse, where they are separated out before feeding the air to an outside vent. While a particular configuration of the hopper has been described above, other configurations may be substituted therefor.

The particle flow rate is varied by: a) controlling the air flow rates through the "spout inlet" and "annulus" lines; and b) setting the height of the pipe and from the top of the spout inlet pipe. Changing any of these variables will change the pressure at the transport pipe inlet and thereby the particulate flow rate. The important factor is that the particulate and spout inlet flow rates are not coupled.

The feeder operates in the same way with a liquid (water, for example) as the transporting fluid.

The flow rates are controlled by a system of sensors, a computer, and control valves. There are two differential pressure sensors to detect pressure drop along the transport pipe. One pressure sensor senses the overall pressure drop along the full length of the vertical transport pipe. Neither the transport pipe length or its diameter are relevant to the invention. In one tested embodiment the transport pipe was approximately 19 feet long and 1.12 inches in internal diameter. Another pressure sensor detects the pressure drop over the top few feet where the flow is non-accelerating. A third differential pressure sensor detects pressure drops along the length of the annulus, and a fourth pressure sensor compares the pressure at the lower end of the annulus to atmospheric pressure.

Other sensors include temperature and humidity detectors in the air feed lines, and a flowmeter for controlling the flow rate of water through the humidifier. Also, all of the air feed lines are equipped with mass flow meters.

The computer inputs data from all the sensors and outputs regulating signals to control valves located in the two air feed lines and in the water feed line to the air humidifier.

The computer program includes a first control loop to maintain the pressure drop across the annulus constant during operation. This is done by adjusting the annulus flow rate valve in response to the input from the differential pressure sensor across the length of the tube section of the annulus. This first control loop is needed because the pressure drop will change with the level of particles in the hopper increasing the air flow rate to the tube section of the annulus.

In a second control loop the computer also sums the readings of the two flowmeters which inject air into the feeder and a third flowmeter which measures the flow rate of gas exiting through the port in the cover of the hopper, and then corrects the flows of the spout inlet and the annulus feed inlet flow rates to maintain a constant total air flow rate.

In a third loop, the transport air humidity is controlled by passing it through a humidifier from the pressure-regulated air supply.

Additional methods of varying the particulate flow rate for a particular spout inlet flowrate include: 1) varying the gap between the spout inlet pipe and the transport pipe by shifting one or the other or both pipes relative to one another; 2) changing the gas flow rate through the annulus from an upflow as described above to a down flow where gas is fed at a variable rate through a port in a cover for the feed hopper; and 3) closing the port in the cover of the hopper, thereby allowing the hopper to be pressurized by the annulus flow. Increasing this pressure will increase the particulate flow rate.

It is noted that sub-micron sized particles do not flow easily, even though they are dry, because of cohesive forces such as chemical (van der Waal forces), electrostatic forces, etc.

It is an object of this invention to provide a transport system with improved control over particulate flow rates.

Another object of this invention is to provide an effective system for transporting cohesive particles having a size of approximately 40 microns or smaller.

Other objects, features and advantages of this invention will become apparent from the following detailed description and the appended claims, reference being had to the accompanying drawings forming a part of the specification, wherein like reference numerals designate corresponding parts of the several views.

DETAILED DESCRIPTION OF THE PREFERRED EMBODIMENT

Before explaining in detail the present invention, it is to be understood that the invention is not limited in its application to the details of a construction and arrangement of parts illustrated in the accompanying drawings, since the invention is capable of other embodiments and of being practiced or carried out in various ways. Also it is to be understood that the phraseology and terminology employed herein is for the purpose of description and not limitation.

Figure 1:
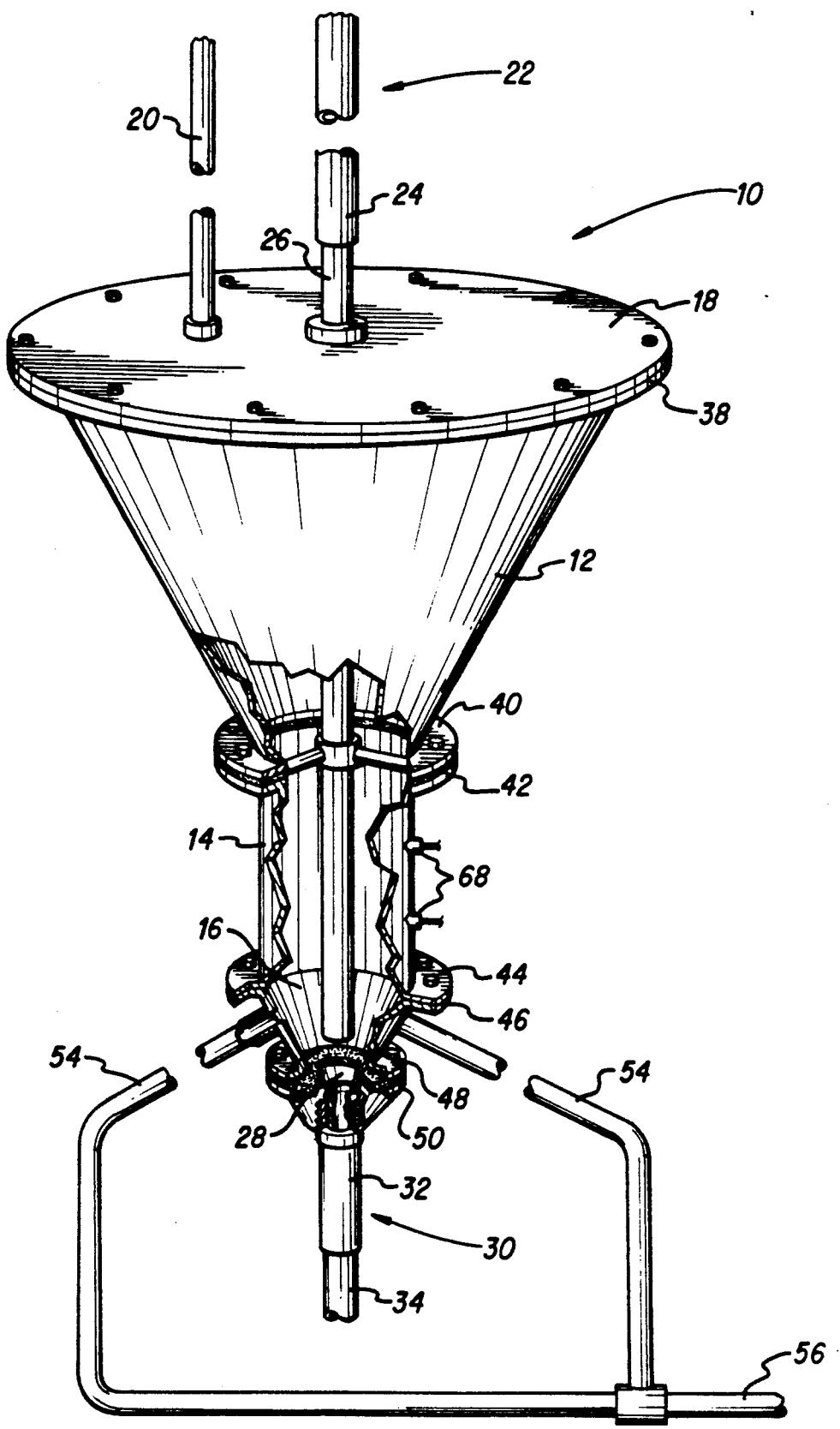
FIG. 1 is a perspective view, partly in section of one embodiment of the spout fluid bed feeder.
Figure 2:
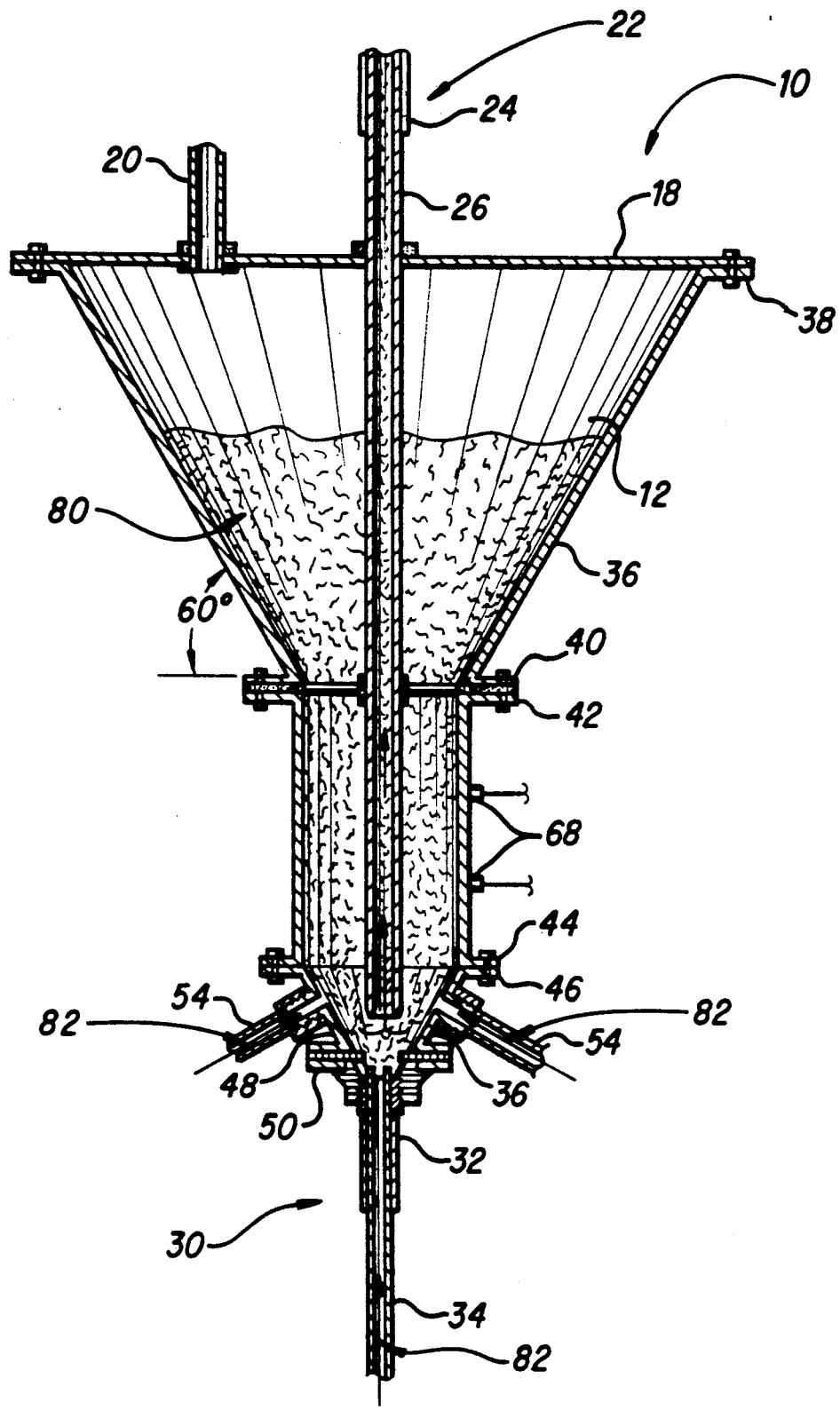
FIG. 2 is a cross-sectional view of the spout fluid bed feeder.

FIG. 1 illustrates a spout fluid bed feeder or feed hopper 10 which forms an integral part of the present invention. Feed hopper 10 includes an inverted large upper conical hopper 12 shaped as the frustum of a cone, a cylindrical tube section 14, and a lower inverted cone 16 connected to the upper inverted cone frustum 12 by said cylindrical tube section 14, said cones 12, 16 and cylindrical tube section being aligned along a vertical axis.

The closed upper end of the hopper 10 is 30 inches in diameter, covered by a plate 18. Plate 18 includes an opening for a pipe 20 forming a fluid exit port, and a second opening for a transport pipe 22 formed of two telescoping pipe sections 24, 26, whereby the gap 28 between the top surface of spout inlet pipe 30 and the end of the lower section 26 may be varied relative to the top surface of spout inlet pipe 30, also formed of two telescoping pipe sections 32, 34.

The side walls 36 of the upper and lower inverted cones 12, 16 make an angle of 60 degrees with the horizontal, although other angles can be used. The cylindrical tube section 14 is approximately 12 inches high, and 6 inches in diameter. Plate 18 is attached to a flange 38 located at the upper rim of the inverted large cone 12. Inverted cone 12 has a second flange 40 attached to an upper flange 42 of cylindrical tube section 14. Lower flange 44 of cylindrical tube section 14 is connected to an upper flange 46 of lower inverted cone 16. Lower flange 48 of lower inverted cone 16 is connected to a flange 50 of outer telescoping pipe 32 of spout inlet pipe 30. Supported between flanges 40 and 42 is an alignment support 52 for transport pipe 22.

Figure 3:
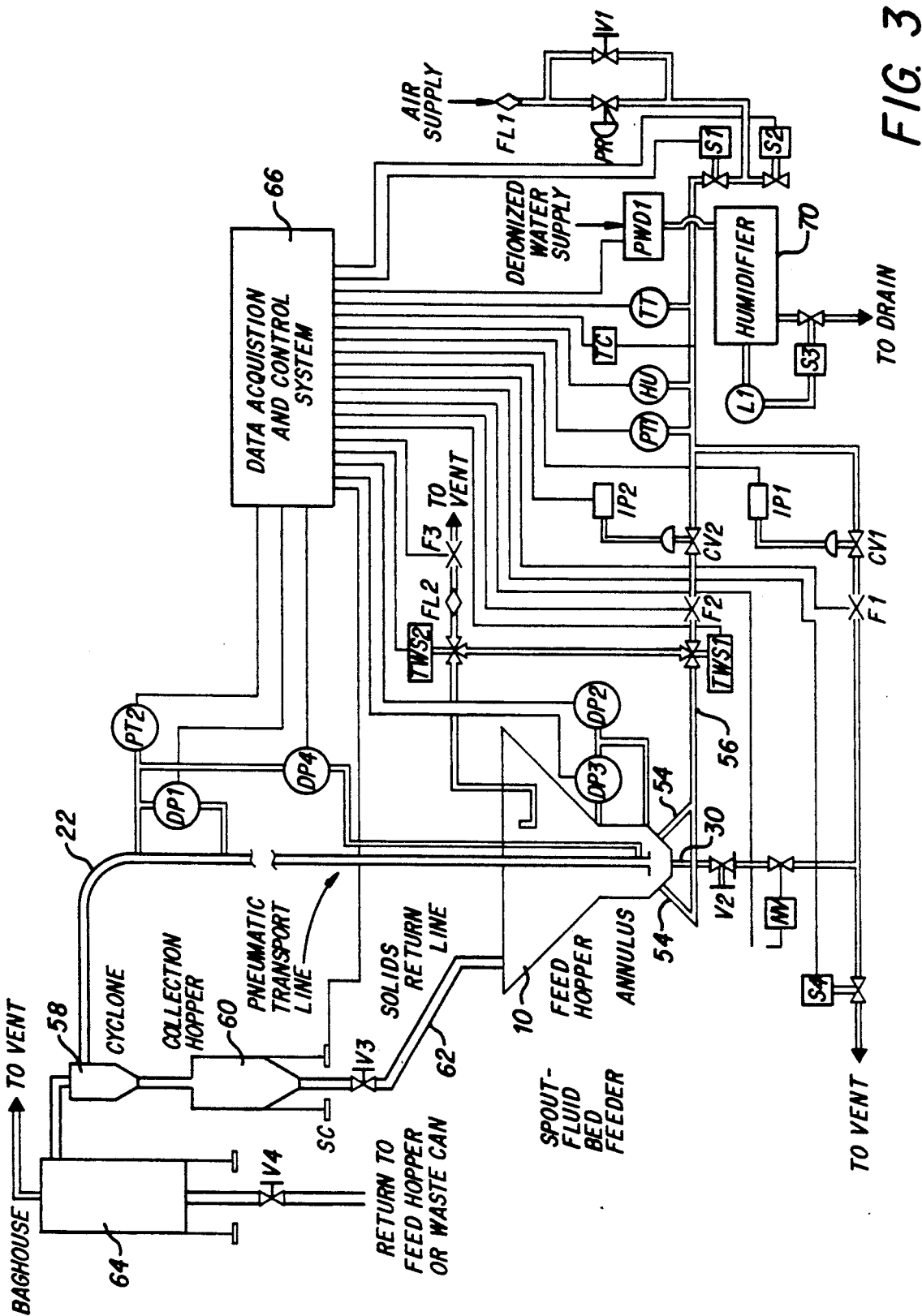
FIG. 3 is a schematic diagram showing the control system used with the spout fluid bed feeder.

Flanges 48 and 50 are located about an inch from the apex of lower inverted cone 16. Located halfway between the base and the apex of lower inverted cone 16 is at least one annulus feed opening connected by a pipe 54 to the spout inlet feed pipe 56 as shown in FIGS. 1 and 3.

In use, feed hopper 10 carries a supply of solid particulates 80 ranging from about 1/10 micron to 20 millimeter size. Transporting fluid, usually air, but which may be a liquid, is forced into feed hopper 10 through spout inlet pipe 30 and annulus feed pipe or pipes 54 from spout inlet fed pipe 56, as indicated by arrows 82. The spout inlet pipe 30 is axially aligned with the transport pipe 22. The transporting fluid fed through the annulus feed pipe or pipes 54 serves to aerate the particles in the annulus or feed hopper 10, and once aerated, they will remain so. The variable cross-section of the lower inverted cone 16 means that the velocity gradient of both air and particles will vary. While the air flow in the annulus is upward, the particle flow is downward.

The number of annulus feed pipes 54 may be multiplied. Three or more pipes 54 may be equally spaced around the side wall 36 of the lower inverted cone 16. Also the pipes 54 may be staggered in height or be directed away from the vertical axis of feed hopper 10 or at an angle to the inner surface of side wall 36 of the lower inverted cone 16.

The upper fluid exit port in cover 18 shown at pipe 20 identifies another potential entry area for transporting fluid into feed hopper 10. Ordinarily the exit port lets air escape from the feed hopper 10. However, the exit port can also be pressurized to force extra air through the particles and up transport pipe 22.

Turning now to FIG. 3, which illustrates the system as used in the laboratory, the fluidized particles entering transport pipe 22 are first directed to a cyclone separate 58 which separates rates the larger particles from smaller particles by centrifugal force. The separated larger particles are collected in collection hopper 60 to be later distributed to either a waste can or back to feed hopper 10 through a solids return line 62. From the cyclone separator 58, the remainder is fed through a baghouse 64, which performs a function similar to cyclone separator 58, namely to separate particles from air. The air is vented to the outside atmosphere while the small particles are directed to feed hopper 10 or to a waste can. The cyclone separator 58, collection hopper 60, solids return line 62 and baghouse 64 are not necessary for the dissemination of the particles.

In one military application the feed hopper 10 and the controlling devices therefor may be mounted within or on a military vehicle, and the vented particulates 80 have the property of deflecting significant portions of the electromagnetic spectrum. Accordingly, the cloud of vented particulates 80 will serve to obscure infrared and other multi-spectral sensors and accordingly, render the military vehicle invisible to such sensors so long as the cloud is maintained.

The effectiveness of the particles used for obscuration of a particular portion of the electromagnetic spectrum depends on their size, shape, and complex refractive index. The size must be of the order of the wavelength of the radiation. The effect of shape is more complicated. For example, spherical particles are effective in visible light and near infrared. Metal flakes are effective in the infrared, and fibers are effective for millimeter waves.

The purpose of the invention is a controlled rate of particle transport. For steady particle flow this goal is reached in the present invention by maintaining a constant pressure at the bottom of transport pipe 22. The particle flow rate is controlled by a system of sensors (described later), a computer 66, and control valves. The computer program monitors the sensors and activates the valves to maintain the desired transport rate.

There are two differential pressure sensors DB4, DB1 to detect pressure drop along transport pipe 22. One sensor DP4 senses the pressure drop along the full length of vertical transport pipe 22. The other sensor DP1 senses the pressure drop over the top few feet.

A third differential pressure sensor DP3 detects pressure drops along the length of cylindrical tube section 14, that is, over the height of the annulus. Tube section 14 has two ¼ inch pressure tap holes 68 located 3 and 6 inches respectively below the top of tube 14, and sensor DP3 is located between them. A fourth differential pressure sensor DP2 compares the pressure at the lower tap 68 to atmospheric pressure.

Other sensors include temperature (TT) and humidity (HU) detectors in the air feed lines 56 and a flow meter PWD1 for the humidifying water supply. Also, all of the air feed lines are equipped with mass flow meters F1, F2, F3.

The computer 66 inputs data from all the sensors, including gauge pressure transmitters PT1, PT2, and outputs regulating signals to control valves located on three air feed lines or pipes 56, including valves CV1, CV2, NV, S1, S2, S4, TWS1, TWS2, and V1-V4, and in the water feed line to the air humidifier 70, such as valve S-3.

The computer program includes a control loop to maintain the fluid pressure drop across the annulus during operation. This is done by adjusting the cone feed flow rate valve V2 in response to input from the differential pressure sensor DP3 across the length of the annulus. This is the first control loop.

This loop is needed because the pressure drop and the feed rate will tend to change with the level of particles in the bed feeder or feed hopper 10.

Computer 66 also sums the readings of all three flowmeters F1, F2, F3 which inject air into the bed feeder and corrects the flows of the spout inlet feed pipe 56 and feed hopper 10 and correct the flows of the spout inlet pipe 30 and feed hopper transport pipe 22 to maintain a constant total air flow rate.

In a third loop, the transport air humidity is controlled by passing it through a humidifier 70 from the pressure-regulated air supply.

Additional control loops maintain constant temperature in the transport air through control means TC.

Other structure shown in FIG. 3 include coalescing air filters FL1 and FL2, a level switch L1, a pressure regulator PR, current to pressure converters IP1, IP2, and a digital weighing scale SC. It is currently contemplated that any conventional drive means including manual means may be used to adjust telescoping pipe sections 24, 26 and 32, 34 to thereby adjust gap 28.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

We claim:

1. A fluidized solid particle transport system comprising:
    a supply of solid particles;
    a hollow, vertically disposed transportation pipe for delivering fluidized solid particles to a desired location;
    a feed hopper for receiving said solid particles, said feed hopper surrounding a bottom end of said transport pipe; said feed hopper being coaxial with said transport pipe;
    a spout inlet feed pipe facing coaxial with said transport pipe, the spout inlet feed pipe facing a bottom opening of said transport pipe with a gap therebetween;
    at least one feed pipe entering a bottom side wall of said hopper;
    a source of fluid connected to said spout inlet feed pipe and said at least one feed pipe;
    regulating means for controlling properties of said fluid, including temperature, humidity, pressure and rate of flow of said fluid through said spout inlet feed pipe, said at least one feed pipe and said transport pipe;
    said feed hopper including:
    an inverted conical frustum connected at a frustum end thereof with a cylindrical tubular section, and an inverted conical section connected to a bottom end of said cylindrical tubular section;
    said spout inlet feed pipe being connected at the apex of said inverted conical section; and
    said at least one feed pipe entering a side wall of said hopper in an annulus feed pipe; whereby
    said solid particles are permeated by said fluid and thereafter fed into said transport pipe at a controlled rate.

2. A fluidized solid particle transport system as in claim 1, said particles having sizes in the range of 0.1 micron to 20 mm.

3. A fluidized solid particle transport system as in claim 1, said solid particles forming a cloud capable of obscuring single spectrum and multi-spectral radiation, respectively, depending upon the size, shape and complex refractive index of said solid particles.

4. A fluidized solid particle transport system as in claim 2, said solid particles forming a cloud capable of obscuring single spectrum and multi-spectral radiation, respectively, depending upon the size of said solid particles.

5. A fluidized solid particle transport system as in claim 1, said particles including a range of sizes from submicron to millimeter size;
    said transport pipe delivers said fluidized solid particles first to a conventional cyclone wherein solid particles larger than about one micron are separated out by centrifuge forces having a remainder portion of fluidized solid particles;
    said remainder portion of fluidized solid particles being then delivered to a baghouse wherein solid particles less than about one micron in size are further separated out;
    with a final remainder portion being vented having fluidized solid particles with a size substantially less than 1 micron.

6. A fluidized solid particle transport system as in claim 1, said feed hopper includes means for changing said gap between said bottom end of said transport pipe and a top end of said spout inlet feed pipe, thereby to change the rate of flow of fluidized solid particles into said transport pipe.

7. A fluidized solid particle transport system as in claim 1, said regulating means further comprising:
    temperature sensing means for the temperature of the fluid for transporting solid particles;

humidity sensing means for sensing the humidity of the fluid for transporting solid particles when the fluid is a gas;

flow meters for detecting the rate of flow of the fluid for transporting solid particles;

pressure sensing means for sensing the pressure of the fluid for transporting solid particles;

computer means for receiving information from said temperature sensing means, said humidity sensing means, said flow meters, and said pressure sensing means; and computer responsive control valve means responsive to output from said computer means; whereby temperature, humidity, flow and pressure of the fluid for transporting solid particles may be regulated.

8. A fluidized solid particle transport system as in claim 1, further comprising:

a plurality of annulus feed pipes entering said side wall of said inverted conical section.

9. A fluidized solid particle transport system as in claim 1, said fluid comprising a gas, said regulating means for controlling humidity being effective to control humidity of said gas.

10. A fluidized solid particle transport system as in claim 1, said fluid comprising a liquid, said regulating means for controlling humidity being ineffective to control humidity of said liquid.

11. A fluidized solid particle transport system for the controlled dispersion of multi-spectral obscurants comprising:

a supply of solid particles;

a hollow, vertically disposed transport pipe for delivering fluidized solid particles capable of reflecting infrared rays, said fluidized solid particles being dispersed as a cloud formation;

a feed hopper for receiving said solid particles, said feed hopper surrounding a bottom end of said transport pipe and including an inverted conical frustum connected at a frustum end thereof with a cylindrical tubular section, and an inverted conical section connected to a bottom end of said cylindrical tubular section, said feed hopper being coaxial with said transport pipe;

a spout inlet feed pipe connected at the apex of said inverted conical section and coaxial with said transport pipe, the inlet feed pipe facing a bottom opening of said transport pipe with a gap therebetween;

at least one annulus feed pipe entering a side wall of said inverted conical section;

a source of fluid connected to said spout inlet feed pipe and said at least one annulus feed pipe; and regulating means for controlling properties of said fluid, including temperature, humidity when said fluid is a gas, pressure and rate of flow of said fluid through said spout inlet feed pipe, said at least one annulus feed pipe and said transport pipe;

said system being mounted on a vehicle; whereby said solid particles are fluidized and thereafter fed through said transport pipe at a controlled rate to be vented to the outside atmosphere surrounding said vehicle to thereby obscure by reflection rays from infrared heat sources such as vehicle engines and the like.

12. A fluidized solid particle transport system as in claim 11, said fluid comprising a gas, said regulating means for controlling humidity being effective to control humidity of said gas.

13. A fluidized solid particle transport system as in claim 11, said fluid comprising a liquid, said regulating means for controlling humidity being ineffective for controlling the humidity of said liquid.

14. A fluidized solid particle transport system comprising:

a hollow, vertically disposed transport pipe for delivering fluidized solid particles to a desired location;

a feed hopper for providing a source of said solid particles, said feed hopper surrounding a bottom end of said transport pipe, said feed hopper being coaxial with said transport pipe;

a spout inlet feed pipe coaxial with said transport pipe, the spout inlet feed pipe facing a bottom opening of said transport pipe with a gap therebetween;

at least one feed pipe entering a bottom side wall of said hopper;

regulating means for controlling properties of fluid including temperature, humidity, pressure and rate of flow of said fluid through said spout inlet feed pipe, said at least one feed pipe and said transport pipe;

said feed hopper including:

an inverted conical frustum connected at a frustum end thereof with a cylindrical tubular section, and an inverted conical section connected to a bottom end of said cylindrical tubular section;

said spout inlet feed pipe being connected at the apex of said inverted conical section; and said at least one feed pipe entering a side wall of said hopper is an annulus feed pipe; whereby said solid particles are permeated by said fluid and thereafter fed into said transport pipe at a controlled rate.

15. A fluidized solid particle transport system as in claim 14, said feed hopper includes means for changing said gap between said bottom end of said transport pipe and a tip end of said spout inlet feed pipe, thereby to change the rate of flow of fluidized solid particles into said transport pipe.

16. A fluidized solid particle transport system as in claim 15, said regulating means further comprising:

temperature sensing means for sensing the temperature of the fluid for transporting solid particles;

humidity sensing means for sensing the humidity of the fluid for transporting solid particles;

pressure sensing means for sensing the pressure of the fluid for transporting solid particles;

computer means for receiving information from said temperature sensing means, said humidity sensing means, said flow meters, and said pressure sensing means; and computer responsive control valve means responsive to output from said computer means; whereby temperature, humidity, flow and pressure of the fluid for transporting solid particles may be regulated.

17. A fluidized solid particle transport system as in claim 14, further comprising:

a plurality of annulus feed pipes entering said side wall of said inverted conical section;

said system being mounted on a vehicle; whereby said solid particles are vented to the outside atmosphere surrounding said vehicle through said transport pipe at a controlled rate to thereby obscure by reflection rays from infrared heat sources such as vehicle engines and the like.

* * * * *